United States Patent
Kung et al.

(10) Patent No.: US 10,616,728 B2
(45) Date of Patent: Apr. 7, 2020

(54) WIRELESS CONNECTING METHOD, BACKUP DEVICE, AND NON-TRANSITORY BACKUP DEVICE-READABLE STORAGE MEDIUM

(71) Applicant: I/O INTERCONNECT, LTD., Santa Ana, CA (US)

(72) Inventors: Gary Kung, Santa Ana, CA (US); Ping-Shun Zeung, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 0 days.

(21) Appl. No.: 16/155,094

(22) Filed: Oct. 9, 2018

(65) Prior Publication Data

US 2019/0289442 A1 Sep. 19, 2019

Related U.S. Application Data

(60) Provisional application No. 62/642,760, filed on Mar. 14, 2018.

(51) Int. Cl.
*H04W 4/20* (2018.01)
*H04W 76/25* (2018.01)
(Continued)

(52) U.S. Cl.
CPC ........... *H04W 4/20* (2013.01); *H04L 67/1097* (2013.01); *H04L 67/141* (2013.01);
(Continued)

(58) Field of Classification Search
CPC ........... H04W 4/20; H04W 4/80; H04W 4/14; H04W 76/25; H04W 8/22; H04W 88/02; H04W 88/08; H04W 88/00; H04W 92/00; H04W 92/18; H04W 4/70; H04W 4/00; H04W 80/12; H04W 84/20; H04W 84/22; H04W 84/18; H04W 24/00; H04W 24/02; H04W 24/04; H04W 4/60; H04W 8/18; H04W 8/20; H04W 8/205; H04W 8/24; H04W 80/02; H04W 76/00; H04W 76/10; H04W 4/18; H04W 92/10; H04W 88/06; H04L 29/08; H04L 67/145; H04L 67/1097; H04L 67/141; H04L 29/08612; H04L 29/12471; H04L 45/026; G06F 11/1456;
(Continued)

(56) References Cited

U.S. PATENT DOCUMENTS

2004/0253983 A1* 12/2004 Vanhatalo et al. ............ 455/558
2005/0165869 A1*  7/2005 Huang et al. .................. 707/204
(Continued)

FOREIGN PATENT DOCUMENTS

CN      102769626 A  * 11/2012 ............. H04L 29/06
WO  WO2010081401 A1 *  7/2010 ............. H04L 69/40

*Primary Examiner* — Meless N Zewdu
(74) *Attorney, Agent, or Firm* — Locke Lord LLP; Tim Tingkang Xia, Esq.

(57) ABSTRACT

A wireless connecting method is disclosed. The wireless connecting method includes the following operations: executing an application of an electronic device by the electronic device; establishing a BLUETOOTH connection between the electronic device and a backup device by the backup device; and keeping the application alive at a background of the electronic device through the BLUETOOTH connection by the backup device.

17 Claims, 2 Drawing Sheets

(51) Int. Cl.
    *H04L 29/08*     (2006.01)
    *H04W 8/22*     (2009.01)
    *H04W 76/10*     (2018.01)
    *H04W 24/04*     (2009.01)
    *H04W 4/24*     (2018.01)
    *H04W 88/06*     (2009.01)
    *H04W 4/80*     (2018.01)

(52) U.S. Cl.
    CPC ............. *H04L 67/145* (2013.01); *H04W 4/24* (2013.01); *H04W 8/22* (2013.01); *H04W 24/04* (2013.01); *H04W 76/10* (2018.02); *H04W 76/25* (2018.02); *H04W 4/80* (2018.02); *H04W 88/06* (2013.01)

(58) Field of Classification Search
    CPC .. G06F 11/1464; G06F 11/1469; G06F 12/16; G06F 11/07; G06F 11/2012; G06F 11/144; G06F 11/1466; G06F 1/1632; G06F 15/025; H04M 2017/2531; H04M 17/305; H01Q 1/2291

See application file for complete search history.

(56) References Cited

U.S. PATENT DOCUMENTS

| | | | |
|---|---|---|---|
| 2007/0110017 A1* | 5/2007 | Fulknier et al. | 370/338 |
| 2012/0066427 A1* | 3/2012 | Johnson et al. | 710/306 |
| 2012/0190412 A1* | 7/2012 | Buniatyan | 455/573 |
| 2012/0233126 A1* | 9/2012 | Kung | 707/654 |
| 2012/0233369 A1* | 9/2012 | Kung | 710/304 |
| 2012/0233493 A1* | 9/2012 | Kung | 714/4.1 |
| 2015/0230078 A1* | 8/2015 | Kandangath et al. | H04W 8/205 |
| 2018/0183855 A1* | 6/2018 | Sabella et al. | H04L 67/04 |
| 2019/0020581 A1* | 1/2019 | Chritz et al. | H04L 45/44 |
| 2019/0200057 A1* | 6/2019 | Cheng | H04N 21/2404 |

\* cited by examiner

WIRELESS CONNECTING METHOD, BACKUP DEVICE, AND NON-TRANSITORY BACKUP DEVICE-READABLE STORAGE MEDIUM

CROSS-REFERENCE TO RELATED APPLICATION

This application claims priority to U.S. Provisional Application Ser. No. 62/642,760, filed Mar. 14, 2018, which is herein incorporated by reference.

FIELD OF INVENTION

The invention relates to a wireless connecting method, a backup device, and a non-transitory backup device-readable storage medium. More particularly, the invention relates to a wireless connecting method, a backup device, and a non-transitory backup device-readable storage medium for wireless connection by BLUETOOTH and Wi-Fi between a backup device and an electronic device.

BACKGROUND

Nowadays, people usually backup their data, including photos or files, from the personal electronic devices, such as cell phones, to the cloud spaces. Sometimes it takes long time to back up all the data to the cloud spaces. If the cell phone is not being used by the human beings, the cell phone turns from the foreground mode to the background mode, and the application which is executed at the cell phone may stop executing when the cell phone turns to the background mode. That is, the cell phone may stop backing up data to the backup device when the cell phone turns to the background mode.

SUMMARY

An embodiment of this disclosure is to provide a wireless connecting method. The wireless connecting method includes the following operations: executing an application of an electronic device by the electronic device; establishing a BLUETOOTH connection between the electronic device and a backup device by the backup device; and keeping the application alive at a background of the electronic device through the BLUETOOTH connection by the backup device.

An embodiment of this disclosure is to provide a backup device. The backup device includes a communication circuit and a processor. The communication circuit is configured to establish a BLUETOOTH connection between an electronic device and the backup device. The processor is configured to transmit a plurality of packets to the electronic device through the BLUETOOTH connection and through the communication circuit to keep an application of the electronic device alive at a background of the electronic device.

The embodiment of the present disclosure is to provide a non-transitory backup device-readable storage medium storing a backup device program performing a wireless connecting method. The wireless connecting method includes the following operations: establishing a BLUETOOTH connection between an electronic device and the backup device through a communication circuit; and transmitting several packets to the electronic device through the BLUETOOTH connection and through the communication circuit so as to keep an application of the electronic device alive at a background of the electronic device.

The embodiment of the present disclosure is to provide a wireless connecting method, a backup device, and a non-transitory backup device-readable storage medium, so as to keep executing the application of the electronic device, such as a cell phone, when the electronic device turns from the foreground mode to the background mode. The backup device is further integrated with the function of wireless charging. The electronic devices usually have to be charged often, and in the embodiments of the present disclosure, the electronic devices start updating whenever the electronic devices are charged by the backup device, which is very convenient. Moreover, even though the user of the electronic device ever forces stop the application, the application may be invoked by beacon to execute the backup function.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
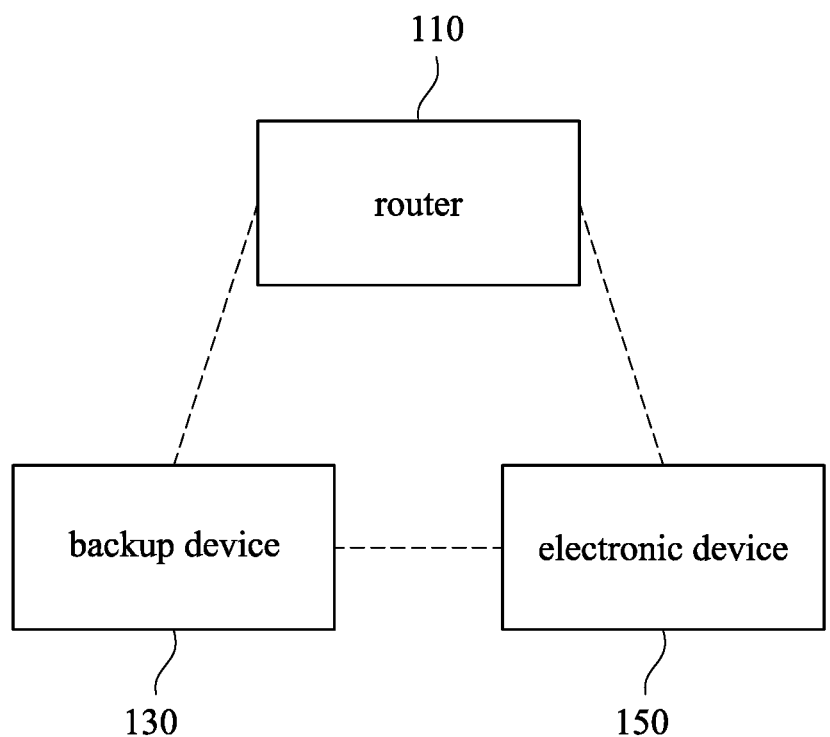
FIG. 1 is a schematic diagram illustrating a wireless connecting system according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the recent disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a wireless connecting system 100 according to some embodiments of the present disclosure. As illustrated in FIG. 1, the wireless charging system 100 includes a router 110, a backup device 130, and an electronic device 150. The wireless connecting system 100 shown in FIG. 1 is for illustrative purposes only and the present disclosure is not limited thereto.

Figure 2:
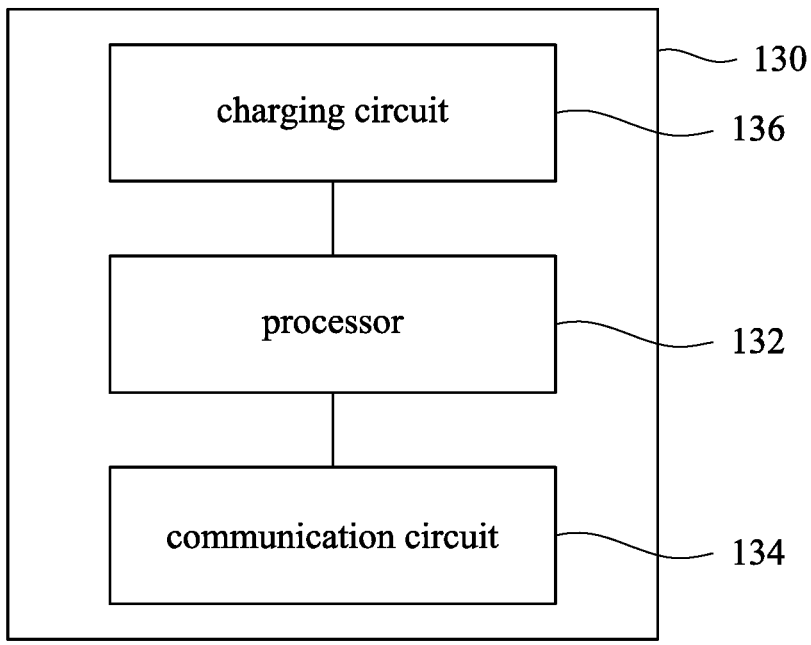
FIG. 2 is a schematic diagram illustrating a backup device according to some embodiments of the present disclosure.

Reference is made to FIG. 2 at the same time. FIG. 2 is a schematic diagram illustrating a backup device 130 according to some embodiments of the present disclosure. As illustrated in FIG. 2, the backup device 130 includes a processor 132, a communication circuit 134, and a charging circuit 136. In the connection relationship, the communication circuit 134 is coupled to the processor 132, and the charging circuit 136 is coupled to the processor 132.

In some embodiments, the communication circuit 134 is configured to establish a BLUETOOTH connection between the electronic device 150 and the backup device 130. The processor 132 is configured to transmit a plurality of packets to the electronic device 150 through the BLUETOOTH connection and through the communication circuit so as to keep an application of the electronic device 150 alive at a background of the electronic device 150. That is, when the application of the electronic device 150 is executed to back up data from the electronic device 150 to the backup device 130 through the router 110, the electronic device 150 may continue to back up data even the electronic device 150 turns from the foreground mode to the background mode since the backup device 130 continues to transmit packets to the electronic device 150 to keep the application alive.

In some embodiments, the electronic device 150 transmits packets to the backup device 130, and the communication circuit 134 of the backup device 130 receives the packets transmitted from the electronic device 150. In some embodiments, the processor 132 is further configured to determine whether the packets transmitted from the electronic device 150 is received. If it is determined that the packets transmitted from the electronic device 150 is received, the processor 132 maintains the BLUETOOTH connection between the electronic device 150 and the backup device 130. On the other hand, if it is determined that the packets transmitted from the electronic device 150 is not received, the processor 132 stops the BLUETOOTH connection between the electronic device 150 and the backup device 130.

In some embodiments, the router 110 establishes a WIFI connection between the backup device 130 and the router 110, in which the WIFI connection is established through the communication circuit 134. The router 110 also establishes a WIFI connection between the router 110 and the electronic device 150. That is, the backup device 130 and the electronic device 150 are in the same WIFI domain.

The router 110 assigns a first IP address to the backup device 130 and assigns a second IP address to the electronic device 150. The processor 132 of the backup device 130 transmits the first IP address to the electronic device 150 through the communication circuit 134 and the BLUETOOTH connection between the backup device 130 and the electronic device 150. After the electronic device 150 obtains the first IP address of the backup device 130, the electronic device 150 may transmit data to the backup device 130 through the WIFI connection by the application. In some embodiments, when the electronic device 150 is backing up data to the backup device 130 by the application, the data that are in need to be backed up are transmitted from the electronic device 150 to the router 110, and then from the router 110 to the backup device 130.

Since the transmission speed of the WIFI connection is faster than the transmission speed of the BLUETOOTH connection, it is more efficient to back up data through the WIFI connection.

In some embodiments, the backup device 130 is integrated with a wireless charging circuit 136. The wireless charging circuit 136 is configured to charge the electronic device 150 wirelessly. The electronic device 150 is further configured to determine whether the electronic device 150 is charged wirelessly by the backup device 130. If it is determined that the electronic device 150 is charged wirelessly by the backup device 130, the processor 132 initiates the operation of keeping the application alive at the background of the electronic device by the BLUETOOTH connection, so that the electronic device 150 may backup data to the backup device 130 continuously.

It is convenient for the users if the electronic device 150 start backing up data automatically whenever the electronic device 150 is charged wirelessly by the backup device 130.

In some embodiments, after the BLUETOOTH connection is not established between the electronic device 150 and the backup device 130, the backup device 130 is further configured as a BLUETOOTH beacon device. The processor of the electronic device 150 determines whether the backup device 130 is within range by scanning the beacon device of 130. If it is determined that the backup device 130 is within range, the application of the electronic device 150 may be executed automatically so as to start backing up data from the electronic device 150 to the backup device 130.

For example, assume that a user does not execute or ever forces stop the application to backup data when he arrives home, the electronic device 150 may detect the existence of the backup device 130. When the user lays the electronic device 150 near the backup device 130, the application of the electronic device 150 is executed automatically so as to start backing up data from the electronic device 150 to the backup device 130. Furthermore, when the user lays the electronic device 150 on the backup device 150 to start the wireless charging, a BLUETOOTH connection is established between the backup device 130 and the electronic device 150, the backup device 130 keeps transmitting packets to the electronic device 150 once in a period of time to keep the application of the electronic device 150 alive at the background of the electronic device 150, and the electronic device 150 starts backing up data to the backup device 130. Even the electronic device 150 turns from the foreground mode to the background mode, the electronic device 150 will back up data to the backup device 130 continuously.

It may be known from the above, in the embodiments of the present disclosure, the application of the electronic device 150 is kept alive at the background of the electronic device 150 by transmitting packets between the electronic device 150 and the backup device 130 through the BLUETOOTH connection, so that the data of the electronic device 150 would not stop backing up data even though the electronic device 150 turns from the foreground mode to the background mode. Furthermore, the operation of backup data is triggered when the electronic device 150 is charging wirelessly by the backup device 130. Since the electronic device 150 has to be charged often, it is convenient if the electronic device 150 backup data automatically whenever the electronic device 150 is charging wirelessly. Moreover, in the embodiments of the present disclosure, even though the user of the electronic device 150 ever forces stop the application, the application may be invoked by beacon to execute the backup function.

Figure 3:
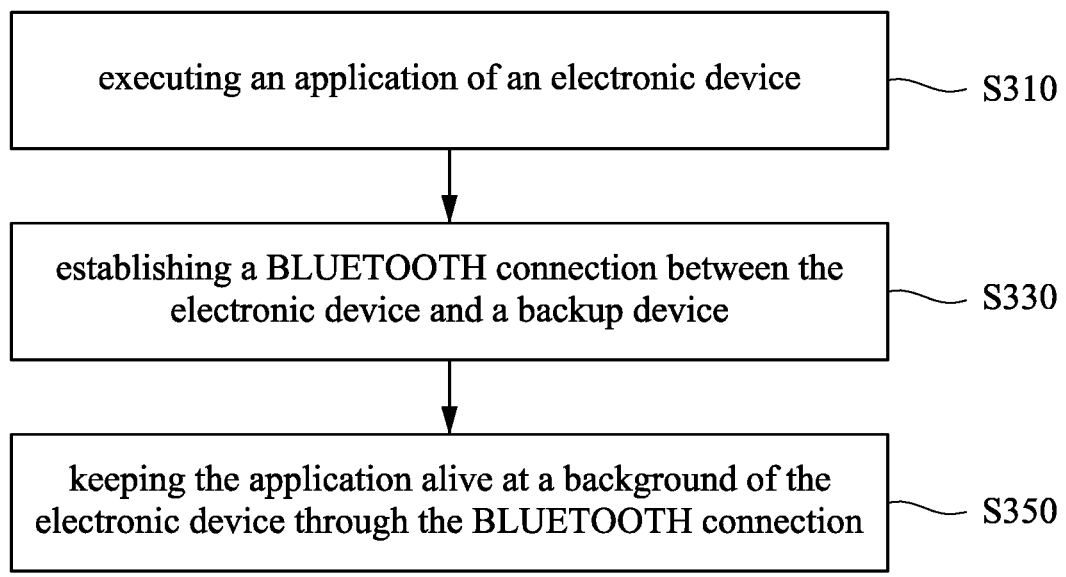
FIG. 3 is a flow chart illustrating a wireless connecting method according to some other embodiments of the present disclosure.

Reference is made to FIG. 3. FIG. 3 is a flow chart illustrating a wireless connecting method 300 according to some embodiments of the present disclosure. The wireless connecting method 300 includes operations S310-S350.

For convenience of explanation and understanding reference is made to FIG. 1 and FIG. 3.

In operation S310, executing an application of an electronic device. In some embodiments, operation S310 may be performed by the electronic device 150, as illustrated in FIG. 1. For example, the electronic device 150 includes an application for updating data, such as files/photos, to the backup device 130. In some embodiments, the user may start the execution of the application. In some other embodiments, the application may be triggered to start executing through BLUETOOTH connection with low energy. For example, the electronic device 150 detects signal strength between the backup device 130 and the electronic device 150, and the electronic device 150 determines whether the signal strength between the electronic device 150 and the backup device 130 is smaller than a predetermined value. If the electronic device 150 determines that the distance between the electronic device 150 and the backup device 130 is smaller than the predetermined distance, since the backup device 130 is configured as a BLUETOOTH beacon device after being paired with the electronic device 150 through the BLUETOOTH connection, the application of the electronic device 150 may executes automatically through the beacon so as to start backing up data from the electronic device 150 to the backup device 130.

In operation S330, establishing a BLUETOOTH connection between the electronic device and a backup device. In some embodiments, operation S330 may be performed by the backup device 130 and/or the electronic device 150, as illustrated in FIG. 1. In some embodiments, the communication circuit 134 of the backup device 130, as illustrated in FIG. 2, establishes a BLUETOOTH connection between the electronic device 150 and the backup device 130.

In operation S350, keeping the application alive at a background of the electronic device through the BLUETOOTH connection. In some embodiments, operation S350 may be performed by the backup device 130 and/or the electronic device 150, as illustrated in FIG. 1. In some embodiments, the backup device 130 transmits packets to the electronic device 150 from time to time. When the electronic device 150 receives the packets transmitted from the backup device 130, the electronic device 150 keeps the application alive at the background of the electronic device 150, so that the application may keep updating data to the backup device 130.

In some embodiments, operation S350 is performed when the electronic device 150 is charging wirelessly by the backup device 130. That is, whenever the electronic device 150 is charging wirelessly by the backup device 130, the application of the electronic device 150 will back up data to the backup device 130, and the backup device 130 keeps the application of the electronic device 150 alive at the background of the electronic device 150 through the BLUETOOTH connection, so that the electronic device 150 keeps backing up data to the backup device 130.

Another embodiment of the disclosure is a non-transitory backup device-readable storage medium. The non-transitory backup device readable storage medium stores instructions for performing the method 300 in aforesaid embodiment shown in FIG. 3.

According to the embodiment of the present disclosure, it is understood that the embodiment of the present disclosure is to provide a wireless connecting method, a backup device, and a non-transitory backup device-readable storage medium, keep executing the application of the electronic device, such as a cell phone, when the electronic device turns from the foreground mode to the background mode. The backup device is further integrated with the function of wireless charging. The electronic devices usually have to be charged often, and in the embodiments of the present disclosure, the electronic devices start updating whenever the electronic devices are charged by the backup device, which is very convenient. Moreover, even though the user of the electronic device ever forces stop the application, the application may be invoked by beacon to execute the backup function.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A wireless connecting method, comprising:
   executing, by an electronic device, an application at a foreground mode of the electronic device to transmit a plurality of data to a backup device;
   establishing, by the backup device, a BLUETOOTH connection with the electronic device; and
   transmitting, by the backup device, a plurality of packets to the electronic device through the BLUETOOTH connection to keep the application alive when the electronic device turns from the foreground mode to a background mode.

2. The wireless connecting method of claim 1, wherein to keep the application alive when the electronic device turns from the foreground mode to the background mode further comprises:
   to keep the application alive when one of the plurality of packets transmitted to the electronic device is detected by the electronic device.

3. The wireless connecting method of claim 1, further comprising:
   establishing a WIFI connection between the electronic device and a router;
   establishing the WIFI connection between the backup device and the router; and
   transmitting the plurality of data from the electronic device to the backup device through the WIFI connection by the application.

4. The wireless connecting method of claim 3, wherein transmitting the plurality of data from the electronic device to the backup device through the WIFI connection by the application comprises:

transmitting the plurality of data to the router by the electronic device; and
transmitting the plurality of data to the backup device by the router.

5. The wireless connecting method of claim 3, further comprising:
obtaining a first IP address of the backup device through the BLUETOOTH connection.

6. The wireless connecting method of claim 5, further comprising:
assigning the first IP address to the backup device by the router; and
assigning a second IP address to the electronic device by the router.

7. The wireless connecting method of claim 1, further comprising:
initiating an operation to keep the application alive at the background mode when the electronic device is charging wirelessly by the backup device.

8. The wireless connecting method of claim 1, further comprising:
triggering the application execution of electronic device automatically by a beacon when it is determined that the backup device is within range from the electronic device.

9. The wireless connecting method of claim 1, further comprising:
configuring the backup device as a BLUETOOTH beacon device.

10. A backup device, comprising:
a communication circuit configured to establish a BLUETOOTH connection between an electronic device and the backup device, wherein the electronic device executes an application at a foreground mode to transmit a plurality of data to the backup device; and
a processor configured to transmit a plurality of packets to the electronic device through the BLUETOOTH connection and through the communication circuit to keep the application alive when the electronic device turns from the foreground mode to a background mode.

11. The backup device of claim 10, wherein the communication circuit is further configured to receive a plurality of packets transmitted from the electronic device.

12. The backup device of claim 11, wherein the processor is further configured to determine whether the plurality of packets transmitted from the electronic device is received so as to maintain the BLUETOOTH connection.

13. The backup device of claim 10, wherein the communication circuit is further configured to establish a WIFI connection between the electronic device and a router, and the communication circuit is further configured to receive the plurality of data from the electronic device through the WIFI connection by the application.

14. The backup device of claim 13, wherein the communication circuit is further configured to receive the plurality of data through the router.

15. The backup device of claim 13, wherein the processor is further configured to transmit a first IP address to the electronic device through the BLUETOOTH connection.

16. The backup device of claim 15, wherein if the electronic device is charging wirelessly by the backup device, the processor is further configured to initiate an operation to keep the application alive at the background mode of the electronic device by the BLUETOOTH connection.

17. A non-transitory backup device-readable storage medium storing a backup device program performing a wireless connecting method, wherein the wireless connecting method comprises:
establishing a BLUETOOTH connection between an electronic device and the backup device through a communication circuit, wherein the electronic device executes an application at a foreground mode to transmit a plurality of data to the backup device; and
transmitting a plurality of packets to the electronic device through the BLUETOOTH connection and through the communication circuit so as to keep the application alive when the electronic device turns from the foreground mode to a background mode.

* * * * *